United States Patent
Jain et al.

(10) Patent No.: US 12,111,806 B2
(45) Date of Patent: Oct. 8, 2024

(54) METHOD AND APPARATUS FOR DETERMINING ASSOCIATED DATA LINKAGES

(71) Applicant: Walmart Apollo, LLC, Bentonville, AR (US)

(72) Inventors: Mridul Jain, Cupertino, CA (US); Saigopal Thota, Fremont, CA (US); Xun Luan, Santa Clara, CA (US); Gajendra Alias Nishad Kamat, Cupertino, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 285 days.

(21) Appl. No.: 16/263,545

(22) Filed: Jan. 31, 2019

(65) Prior Publication Data

US 2020/0250161 A1     Aug. 6, 2020

(51) Int. Cl.
*G06F 16/22*     (2019.01)
*G06F 9/455*     (2018.01)
*G06F 16/21*     (2019.01)

(52) U.S. Cl.
CPC .......... *G06F 16/22* (2019.01); *G06F 9/45558* (2013.01); *G06F 16/211* (2019.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,141,650 B1* | 9/2015 | Nicks | G06F 16/2246 |
| 9,830,190 B1* | 11/2017 | Pfleger, Jr. | H04L 41/0895 |
| 9,892,166 B2* | 2/2018 | Gukal | G06F 16/248 |
| 10,671,951 B2* | 6/2020 | Shrimali | G06Q 10/06315 |
| 10,810,030 B2* | 10/2020 | Deodhar | G06F 9/5027 |
| 10,990,255 B1* | 4/2021 | Tarleton | G06F 3/04842 |
| 2009/0327434 A1* | 12/2009 | Reynolds | G06Q 30/02 709/206 |
| 2010/0106713 A1* | 4/2010 | Esuli | G06K 9/6276 707/716 |
| 2015/0309824 A1* | 10/2015 | Archer | H04L 67/131 718/1 |
| 2018/0367434 A1* | 12/2018 | Kushmerick | H04L 43/14 |
| 2020/0042609 A1* | 2/2020 | Huang | G06F 16/24554 |

(Continued)

*Primary Examiner* — Kris E Mackes
*Assistant Examiner* — Cao D Vuong
(74) *Attorney, Agent, or Firm* — Morgan, Lewis & Bockius LLP; Manita Rawat

(57) ABSTRACT

This application relates to apparatus and methods for automatically associating customer data to a corresponding customer. A computing device may receive linking data identifying a plurality of links, where each like associates at least two nodes that each represent customer data. The computing device may partition the linking data into multiple partitions, and cause a union find algorithm to be executed for each partition in parallel to associate each node with a parent ID. The computing device may iteratively execute a global shuffle algorithm to place all same nodes in a same partition, and may assign a same parent ID to the same nodes. The computing device may iteratively execute a path compression algorithm across all partitions to generate a graph output that associates all child nodes of a same parent node with the same parent ID.

20 Claims, 7 Drawing Sheets

(56) References Cited

U.S. PATENT DOCUMENTS

2020/0057665 A1* 2/2020 Kushmerick ....... G06F 9/45558
2020/0110195 A1* 4/2020 Dow ................... G06F 30/28
2020/0250161 A1* 8/2020 Jain .................... G06Q 30/02

* cited by examiner

METHOD AND APPARATUS FOR DETERMINING ASSOCIATED DATA LINKAGES

TECHNICAL FIELD

The disclosure relates generally to data analysis and, more specifically, to linking associated data.

BACKGROUND

At least some retailers collect customer information for a variety of reasons. Customer information may include information that identifies the customer, or information related to their purchase history, such as in-store purchase information or online purchase information, for example. Retailers may collect customer information to determine purchasing habits of those customers, for example. In some examples, customer information may include customer advertisement activity. Retailers may collect customer advertisement activity to determine if product advertisements, such as online advertisements, are effective, among other reasons. For example, a retailer may collect data related to whether an online advertisement was viewed or clicked on by a customer, and whether a purchase resulted from the view or click.

Retailers may collect customer information from either internal sources (e.g., in-store purchases, accounts customers have created with the retailer, online accounts, online purchases made on a retailer's website, etc.), or external sources, such as third-party providers of customer information. Retailers may benefit from identifying a customer associated with customer data, such as to properly attribute in-store or online purchases, or customer advertisement activity, to the proper customer.

SUMMARY

The embodiments described herein are directed to automatically relating customer data, such as customer data that is obtained from various channels including internal sources and external sources, to a corresponding customer. As a result, a retailer may be able to more effectively track customer activity, such as in-store purchases, online purchases, customer advertisement activities, or any other suitable customer related activities to a proper customer.

In some embodiments, a computing device is configured to obtain linkage data identifying a plurality of linkages, where each linkage identifies a link between a plurality of nodes. Each node may represent, for example, differing customer data. In some examples, the computing device may generate at least a portion of the linking data based on transaction data, such as in-store or online transaction data. The computing device may be configured to partition the linkage data into a number of logical partitions. The computing device may execute, for each partition, a union find algorithm. In some examples, the computing device is configured to execute the union find algorithms in each partition in parallel. The execution of each union find algorithm causes an identifier (e.g., a parent ID) to be assigned to each node of the plurality of nodes of each linkage of the plurality of linkages based on the linkage data of each respective partition. The computing device may also be configured to execute a global shuffle algorithm that reassigns a same node of the plurality of nodes of each linkage of the plurality of linkages to a same partition of the number of logical partitions. The computing device may further be configured to execute a path compression algorithm that causes the identifier of each node of the plurality of nodes of each linkage of the plurality of linkages that follows from a common node to be reassigned to a same identifier.

In some embodiments, a method is provided that includes obtaining linkage data identifying a plurality of linkages, where each linkage is between a plurality of nodes. In some examples, the method may include generating at least a portion of the linking data based on obtained transaction data. The method may include partitioning the linkage data into a first number of logical partitions. The method may also include executing, for each partition, a union find algorithm, where the execution of each union find algorithm causes an identifier to be assigned to each node of the plurality of nodes of each linkage of the plurality of linkages based on the linkage data of each respective partition. The method may further include executing a global shuffle algorithm that reassigns a same node of the plurality of nodes of each linkage of the plurality of linkages to a same partition of the first number of logical partitions. The method may also include executing a path compression algorithm that causes the identifier of each node of the plurality of nodes of each linkage of the plurality of linkages that follows from a common node to be reassigned to a same identifier.

In yet other embodiments, a non-transitory computer readable medium has instructions stored thereon, where the instructions, when executed by at least one processor, cause a device to perform operations that include obtaining linkage data identifying a plurality of linkages, where each linkage is between a plurality of nodes. In some examples, the operations may include generating at least a portion of the linking data based on obtained transaction data. The operations may include partitioning the linkage data into a first number of logical partitions. The operations may also include executing, for each partition, a union find algorithm, where the execution of each union find algorithm causes an identifier to be assigned to each node of the plurality of nodes of each linkage of the plurality of linkages based on the linkage data of each respective partition. The operations may further include executing a global shuffle algorithm that reassigns a same node of the plurality of nodes of each linkage of the plurality of linkages to a same partition of the first number of logical partitions. The operations may also include executing a path compression algorithm that causes the identifier of each node of the plurality of nodes of each linkage of the plurality of linkages that follows from a common node to be reassigned to a same identifier.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
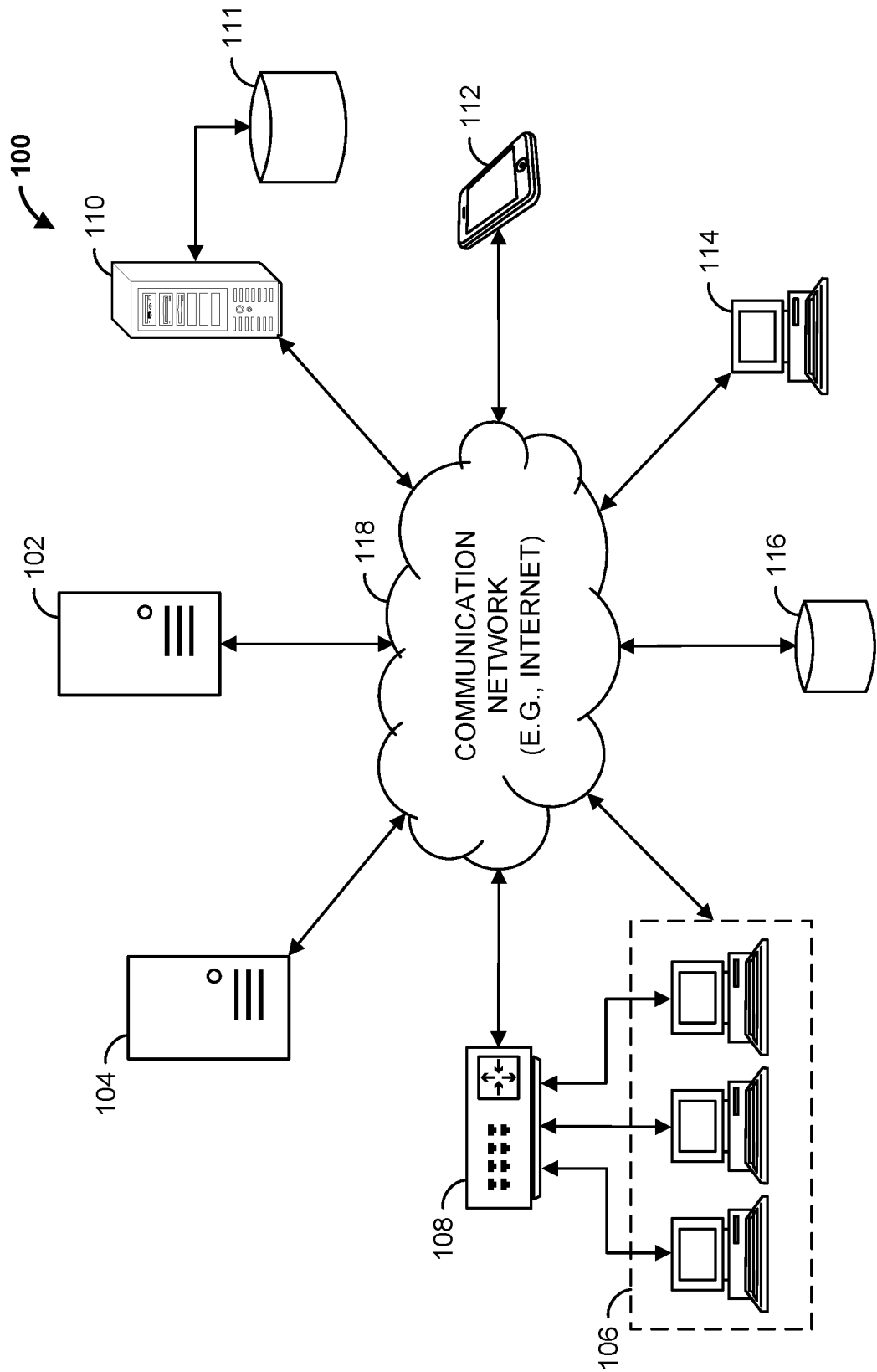
FIG. 1 is a block diagram of a data linkage system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a data linkage system 100 that includes a data linkage computing device 102 (e.g., a server, such as an application server), a web hosting device 104 (e.g., a web server), workstation(s) 106, database 116, linkage data server 110, and multiple customer computing devices 112, 114 operatively coupled over network 118. Data linkage computing device 102, web hosting device 104, linkage data server 110, and multiple customer computing devices 112, 114 can each be any suitable computing device that includes any hardware or hardware and software combination for processing and handling information. In addition, each can transmit data to, and receive data from, communication network 118.

For example, each of data linkage computing device 102, web hosting device 104, linkage data server 110, and multiple customer computing devices 112, 114 can be a computer, a workstation, a laptop, a mobile device such as a cellular phone, a web server, an application server, a cloud-based server, or any other suitable device. Each can include, for example, one or more processors, one or more field-programmable gate arrays (FPGAs), one or more application-specific integrated circuits (ASICs), one or more state machines, digital circuitry, or any other suitable circuitry.

Although FIG. 1 illustrates two customer computing devices 112, 114, data linkage system 100 can include any number of customer computing devices 112, 114. Similarly, data linkage system 100 can include any number of workstation(s) 106, data linkage computing devices 102, web servers 104, digital advertisement data servers 110, and databases 116.

Workstation(s) 106 are operably coupled to communication network 118 via router (or switch) 108. For example, workstation(s) 106 can communicate with data linkage computing device 102 over communication network 118. The workstation(s) 106 can allow for the configuration and/or programming of data linkage computing device 102, such as the controlling and/or programming of one or more processors of data linkage computing device 102. Workstation(s) 106 may also communicate with web server 104. For example, web server 104 may host one or more web pages, such as a retailer's website. Workstation(s) 106 may be operable to access and program (e.g., configure) the webpages hosted by web server 104.

Data linkage computing device 102, web server 104, and workstation(s) 106 may be operated by a retailer. Customer computing devices 112, 114 may be computing devices operated by customers of a retailer. For example, web server 104 may host one or more web pages for the retailer. Each customer computing device 112, 114 may be operable to access the one or more webpages hosted by web server 104 over communication network 118. For example, a customer operating a customer computing device 112, 114 may view a digital advertisement on a webpage hosted by web server 104, and purchase the advertised product from the retailer's website, also hosted on web server 104.

Data linkage computing device 102 is operable to communicate with database 116 over communication network 118. For example, data linkage computing device 102 can store data to, and read data from, database 116. Database 116 may be a tangible, non-transitory memory. For example, database 116 may be a remote storage device, such as a cloud-based server, a memory device on another application server, a networked computer, or any other suitable remote storage. Although shown remote to data linkage computing device 102, in some examples, database 116 can be a local storage device, such as a hard drive, a non-volatile memory, or a USB stick. Database 116 may store customer data, such as transaction data related to a customer's purchase of an item. For example, database 116 may store transaction data for items bought in a store, and may store transaction data for items bought online, such as on a retailer's website.

Linkage data server 110 may provide linkage data. The linkage data may link two or more nodes, where each node may represent an identifying feature of a customer or transaction. For example, a node may identify an online identification (ID) such as a cookie, a customer account login ID, a credit card number, a purchase timestamp, a customer name, a purchase timestamp, or a network address, for example. In some examples, a node is known as a "trentyid" or "tid." Linkage data may "link" two or more nodes together, indicating that the two are associated. For example, linkage data may link a credit card number and an online ID together. In some examples, linkage data server 110 is operated by a third party. Linkage data sever 110 may store linkage data in a database, such as database 111.

Data linkage computing device 102 may be operable to request and receive linkage data from linkage data server 110 over communication network 118. For example, linkage data server 110 may provide linkage data related to one or more advertisement campaigns that belong to a retailer, where each advertisement campaign is associated with one or more digital advertisement placed on one or more websites. For example, linkage data server 110 may provide a continuous feed of all linkage data records that belong to any advertisement campaigns run by the retailer.

Communication network 118 can be a WiFi network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Data linkage system 100 may allow a retailer to associate linkage data to a particular customer. For example, and as described in further detail below, data linkage computing device 102 may obtain transaction data from database 116. The transaction data may include, for example, a list of items purchased in a particular transaction, and a customer identification (ID) for the purchase, which may identify the purchasing customer. The transaction data may identify in-store, or online, transactions. Data linkage computing device 102 may generate linkage data based on the obtained transaction data. Data linkage computing device 102 may also obtain linkage data from one or more linkage data servers 110. Data linkage computing device 102 may then determine connected components from the obtained transaction data and linkage data, e.g., data linkage computing device 102 may associate transaction data and linkage data with a same customer.

For example, data linkage computing device 102 may divide linkage data (e.g., linkage data received from linkage data server 110 and linkage data generated based on transaction data) into logical partitions. Data linkage computing device 102 may assign the linkage data to various partitions based on the processing resources available to data linkage computing device 102. For example, data linkage computing device 102 may assign the partitions to various Virtual Machines (VMs) being executed by servers of a datacenter.

Data linkage computing device 102 may then execute a Weighted Union Find algorithm, such as Weighted Union Find with Path Compression, for each partition (for example, in parallel among the multiple VMs available to data linkage computing device 102), to assign a parent ID to all nodes of all linkages in each partition. In other words, nodes of linkages in each partition are assigned a parent ID in accordance with a Weighted Union Find algorithm based only on linkage data within each partition. This may result, for example, in a particular node in one partition to have a different parent ID that the same node in another partition.

Data linkage computing device 102 may then merge the individually processed partitions by executing a Global Shuffle algorithm. For example, by the end of the execution of the Weighted Union Find algorithm in each partition, each node in each partition is associated with a parent ID. However, a same node may have one parent ID in one partition, and a different parent ID in another partition. As such, the Global Shuffle algorithm converges all same nodes in different partitions to have a same parent ID. For each iteration of the Global Shuffle algorithm, the partitions are searched to find same nodes with different parent IDs. Same nodes are placed into a same partition. In some examples, same nodes with parent IDs that are lower in value (e.g., smaller number) are placed in the partition that includes the node of the same nodes with the highest value (e.g., highest number). In addition, the parent IDs of all of the same nodes with lower value are reassigned to the parent ID of the node with the highest value. The Global Shuffle algorithm may be iteratively repeated until all same nodes have the same parent ID (and thus located in the same partition). The Global Shuffle algorithm converges when there are no same nodes (e.g., "tids") in a same partition with different parent IDs. The converged nodes and parent Ids may be stored to a non-volatile memory, such as database 116.

As noted above, the Global Shuffle algorithm may be executed iteratively until all similar nodes each have one parent ID. Although all similar nodes may now be associated with a same parent ID, the connected nodes (e.g., links) may not be path compressed. For example, while a child node may be linked with a parent node in one link, and the parent node may be linked to a grandparent node in another link.

Data linkage computing device 102 may iteratively execute a Path Compression algorithm until all connected nodes are path compressed. Optionally, data linkage computing device 102 may assign the connected nodes to logical partitions, and may iteratively execute the Path Compression algorithm across the partitions until all connected components are path compressed.

As a result of executing the Path Compression algorithm, the connected nodes each have one parent ID, which are path compressed as well. In the example above, the child node would now be linked to the grandparent node in the first link, and the parent node would still be linked to the grandparent node in the second link. As such, the child node and the parent node link to the grandparent node, which is now each of their parent ID.

Figure 2:
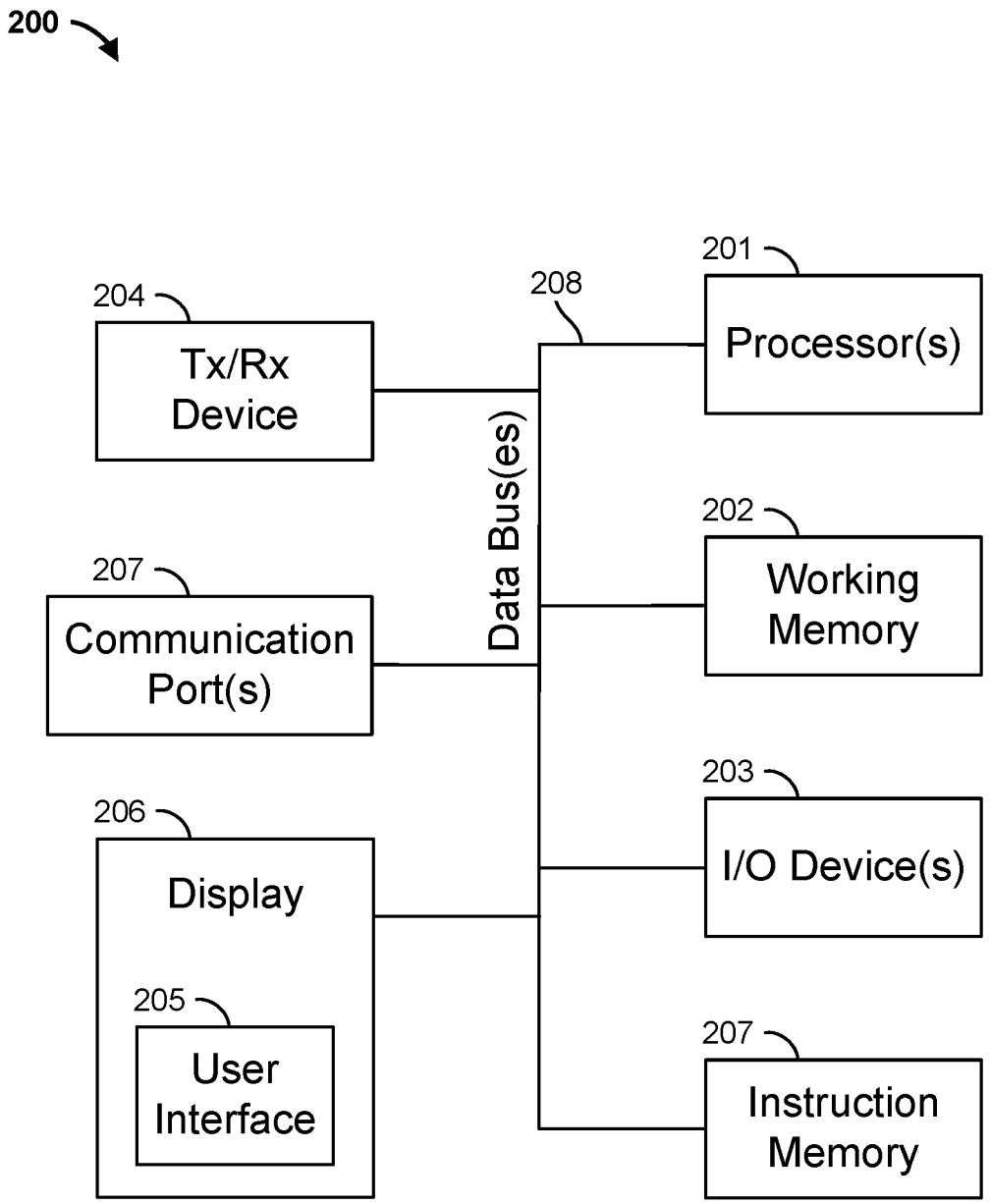
FIG. 2 is a block diagram of the data linkage computing device of FIG. 1 in accordance with some embodiments.

FIG. 2 illustrates the data linkage computing device 102 of FIG. 1. Data linkage computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of data linkage computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as linkage data.

Display 206 can display user interface 205. User interfaces 205 can enable user interaction with data linkage computing device 102. For example, user interface 205 can be a user interface for an application that allows for the viewing of semantic representations of user queries. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 data linkage computing device 102 will be operating in. Processor(s) 201 is operable to receive data from, or send data to, a network, such as communication network 118 of FIG. 1, via transceiver 204.

Figure 3:
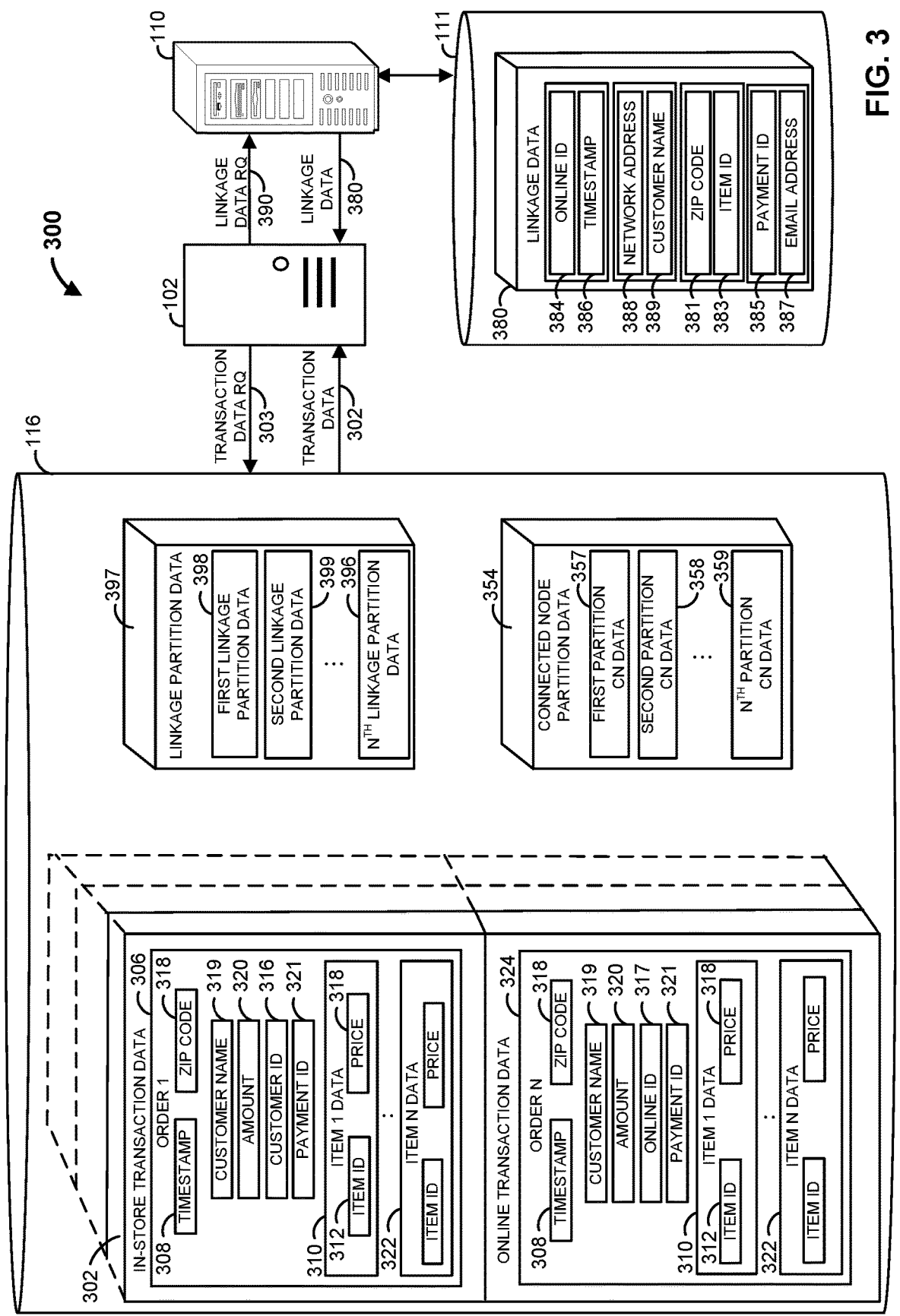
FIG. 3 is a block diagram illustrating examples of various portions of the data linkage system of FIG. 1 in accordance with some embodiments.

FIG. 3 is a block diagram illustrating examples of various portions of the data linkage system 100 of FIG. 1. As indicated in the figure, database 116 includes customer transaction data 302, which identifies previous transactions, such as purchase orders, for one or more customers. The transactions may have taken place in-store, or online. For example, in-store transaction data 306 identifies and characterizes an in-store transaction, and online transaction data 324 identifies and characterizes an online transaction. Customer transaction data 302 may be generated by, for example, a computing device. For example, at a retailer's location, a computing device, such as workstation 106, may generate in-store transaction data 306 for a completed transaction (e.g., purchase), and may store the in-store transaction data 306 in database 116. For online purchases, a web server, such as web server 104, may generate online transaction data 324, and may store the online transaction data 324 in database 116.

Database 116 may store transaction data 302, such as in-store transaction data 306 and online transaction data 324, for multiple transactions involving multiple customers. In-store transaction data 306 may include, for example, data identifying and characterizing one or more previous in-store purchases. For example, the data may include a transaction timestamp 308 identifying a date and/or time of the transaction, and an amount 320 (e.g., purchase cost) of the transaction. The data may also include a customer ID 316, which may be a household ID that identifies a household (e.g., people living together at a particular address). The data may also include a transaction zip code 318, which may identify the zip code of an address of the customer, or the zip code of the retailer's location where the transaction is being made. In some examples, the data may include a customer name 319 identifying the name of the customer. In some examples, the data may include a payment identifier 321, identifying the payment form, such as a credit card number used for the in-store transaction. The data may also include item data 310, 322 identifying one or more items that were purchased. For example, each item data 310, 322 may identify an item identification (ID) 312 of a purchased item, which may be a stock keeping unit (SKU) of the item in some examples. Item data 310, 322 may also include a price 318 of the purchased item.

Online transaction data 324 may include, for example, data identifying and characterizing one or more previous online purchases. For example, the data may include a transaction timestamp 328 identifying a date and/or time of the online transaction, and a purchase amount 340 of the transaction. The data may also include a customer ID 336, which may identify the customer's online account, for example. The data may also include a purchase zip code 358, which may identify the zip code of an address of the customer. In some examples, the data may include a customer name 359 identifying the name of the customer, and a payment identifier 351, identifying the payment form, such as a credit card number used for the online transaction. The data may also include item data 350, 372 identifying one or more items that were purchased. For example, each item data 350, 372 may identify an item identification (ID) 352 of a purchased item, which may be an SKU of the item in some examples. Item data 350, 372 may also include a price 358 of the purchased item.

Data linkage computing device 102 may obtain transaction data 302 from database 116 in response to a transaction data request 303, and may generate linkage data based on the obtained transaction data 302. For example, data linkage computing device 102 may obtain in-store transaction data 306, and generate a link that links a first node identifying customer ID 316 to a second node identifying payment ID 321 for a given order (e.g., transaction). As another example, data linkage computing device 102 may obtain in-store transaction data 306, and generate a link that links a first node identifying customer name 319 to a second node identifying item 1 data 310 for a given order. Similarly, data linkage computing device may obtain online transaction data 324, and generate a link that links a first node identifying an online ID 317 to a second node identifying customer name 319 for a given order. As yet another example, data linkage computing device may obtain online transaction data 324, and generate a link that links a first node identifying a payment ID 321 to a second node identifying an item ID 312 for a given order.

In addition, data linkage computing device 102 may obtain linkage data 380 from one or more linkage data servers 110. For example, in response to a linkage data request 390, linkage data server 110 may provide linkage data 380, which may be stored in database 111, to data linkage computing device 102. For example, in response to a linkage data request 390, linkage data server 110 may continuously provide linkage data 380 (e.g., in a feed, as it becomes available) to data linkage computing device 102.

Database 111 may store linkage data 380, which identifies links of customer data. For example, linkage data 380 may include a first link that associates an online ID 384 with a timestamp 386, such as a timestamp of when a digital advertisement was viewed. Linkage data 380 may also include a second link that associates a network address 388 of a computing device (such as of a computing device used to view a digital advertisement), with a customer name 389. Linkage data may include a third link that associates a zip code 381 with an item ID 383 such as an SKU of an item. Linkage data 380 may also include a fourth link that associates a payment ID 385, such as a credit card number, with an email address 387.

Data linkage computing device 102 may aggregate linkage data 380 as well as linkage data generated from transaction data 302, and divide the aggregated linkage data into multiple partitions. The number of partitions may be determined based on the processing resources available to data linkage computing device 102. For example, data linkage computing device 102 may determine the number of partitions based on a number of VMs, or a number of processors or processing cores, available to execute Weighted Union Find with Path Compression algorithms in parallel.

Data linkage computing device 102 may store the partitioned data in database 116 as illustrated by linkage partition data 397. Linkage partition data 397 may include, for example, first linkage partition data 398 for a first partition, second linkage partition data 399 for a second partition, up to $N^{th}$ linkage partition data 396 for a $N^{th}$ partition. In some examples, the aggregated linkage data is assigned randomly to the partitions. In some examples, the amount of aggregated linkage data assigned to each partition is based on the processing resources available to data linkage computing device 102.

Upon partitioning the aggregated linkage data, Weighted Union Find with Path Compression algorithms are executed, in parallel in some examples. For example, data linkage computing device 102 may provide the partitioned linkage data to one or more VMs, and command the VMs to execute the Weighted Union Find with Path Compression algorithms. In some examples, data linkage computing device 102 executes the Weighted Union Find with Path Compression algorithms among multiple processors 201 or processing cores of one or more processors 201. As a result, each node in each partition will have an assigned parent ID to form a connected node.

Figure 5D:
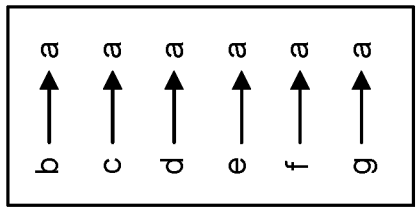
FIGS. 5A-5D illustrate examples of connected nodes that may be determined by the data linkage computing device of FIG. 1 in accordance with some embodiments.
Figure 5C:
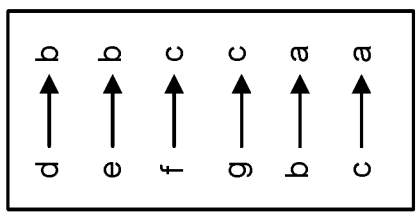
Figure 5B:
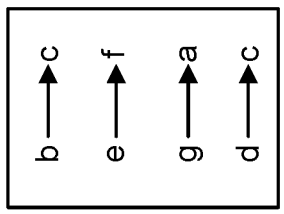
Figure 5A:
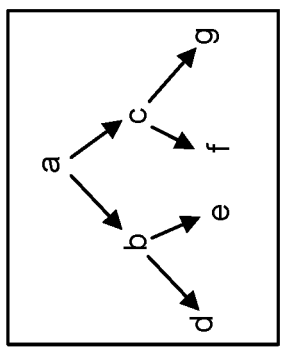

For example, assume a node hierarchy as illustrated in FIG. 5A. The node hierarchy indicates that node "a" is the parent of nodes "b" and "c". Node "b" is the parent of nodes "d" and "e", and node "c" is the parent of nodes "f" and "g". Data linkage computing device 102 may receive linkage data for the node hierarchy in FIG. 5A as illustrated in FIG. 5B. For example, linkage data 380 may include links "b→c," "e→f," "g→a," and "d→c," as well as others. Assuming that the linkage data as shown in FIG. 5B is all in one partition, upon execution of the Weighted Union Find with Path Compression algorithm for that partition, data linkage computing device 102 may generate links as illustrated in FIG. 5C. For example, each child node is now associated with its immediate parent node. Specifically, the links are now "d→b," "e→b," "f→c," "g→c," "b→a," and "c→a."

Data linkage computing device 102 may store the connected nodes for each partition in database 116 as illustrated by connected node partition data 357. Connected node partition data 357 may include, for example, first partition connected node (CN) data 357 for the first partition, second partition CN data 358 for the second partition, up to $N^{th}$ partition CN data 359 for the $N^{th}$ partition.

Upon completion of execution of the Weighted Union Find with Path Compression algorithms for each of the partitions, data linkage computing device 102 may merge the processed partitions by iteratively executing a Global Shuffle algorithm until each similar node is associated with the same parent ID. For example, if a node is present in multiple partitions for an iteration, the nodes are placed into a same partition. A parent ID is then resolved for the nodes. The Global Shuffle algorithm is repeated until all similar nodes are placed in a same partition.

For example, assume node "b" was in a first partition with a parent ID of "a" as a result of executing the Weighted Union Find with Path Compression algorithm for that partition, and also in a second partition with a parent ID of "d" as a result of executing the Weighted Union Find with Path Compression algorithm for that partition. The two links may be brought into the same partition (e.g., the first partition), and a parent ID for "b" may be resolved. For example, the new parent for "b" may be "a" for example.

The resulting links of the Global Shuffle algorithm may yield uncompressed results. For example, as illustrated in FIG. 5C, each node is linked with its immediate parent. To assure path compression, data linkage computing device 102 may execute a Path Compression algorithm, which may be executed iteratively until all nodes are associated with a final parent ID. In other words, each "tid" would be one hop away from its final parent ID, with no additional hops in between. For example, as illustrated in FIG. 5D, after execution of the Path Compression algorithm in this step, all child nodes (i.e., "b" and "c") and grandchild nodes (i.e., "d," "e," "f," and "g") are linked to the same parent node (i.e., "a"). The resulting connected nodes may be stored, for example, in database 116, and may be presented to a user via display 206.

Figure 4:
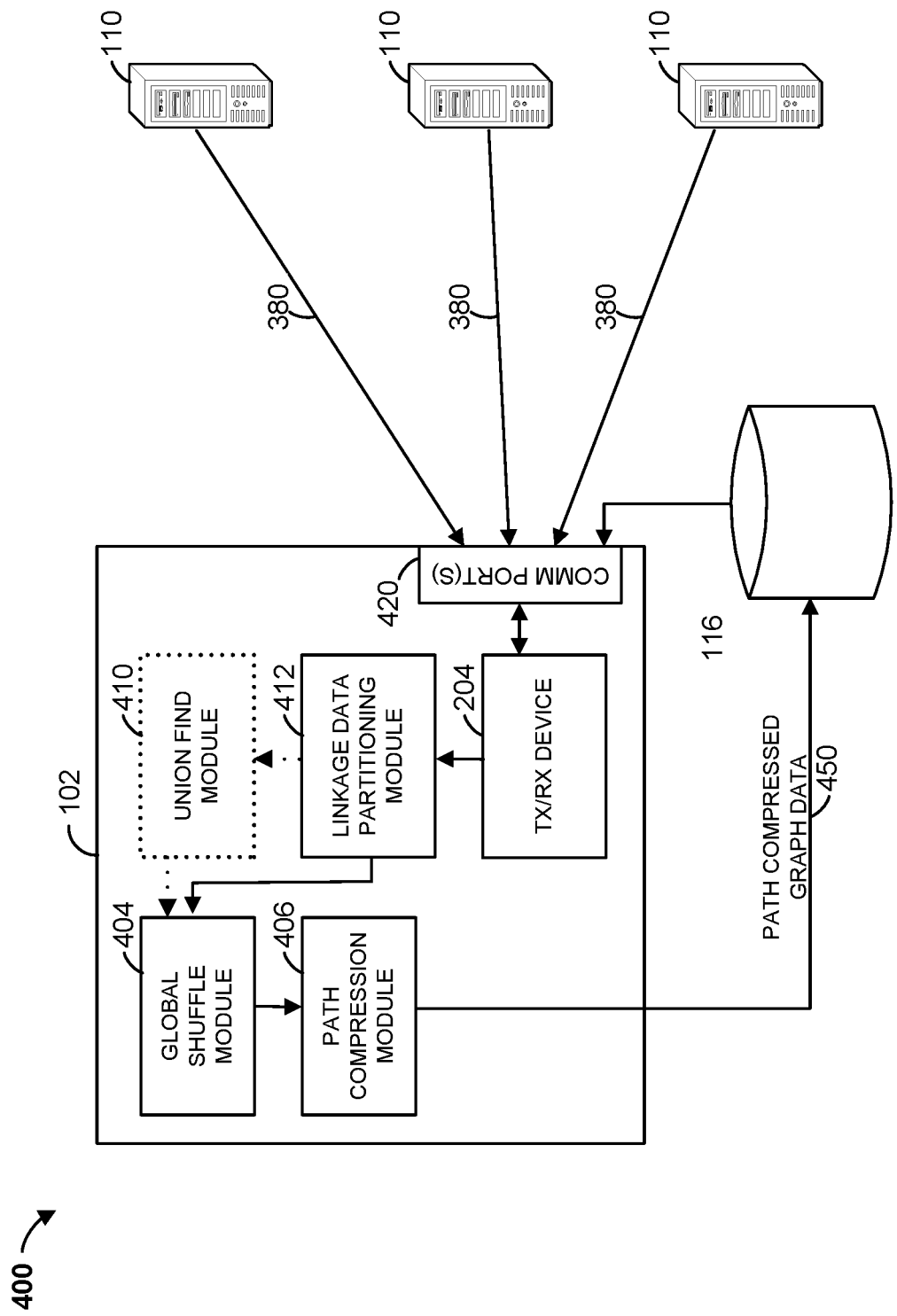
FIG. 4 is a block diagram illustrating examples of various portions of the data linkage system of FIG. 1 in accordance with some embodiments.

FIG. 4 illustrates a block diagram of various portions of the data linkage system 100 of FIG. 1. As indicated in the figure, data linkage computing device 102 includes global shuffle module 404, path compression module 406, linkage data partitioning module 412, and, in some examples, union find module 410. In some examples, one or more of global shuffle module 404, path compression module 406, linkage data partitioning module 412, and, union find module 410 may be implemented in hardware. In some examples, one or more of global shuffle module 404, path compression module 406, linkage data partitioning module 412, and, union find module 410 may be implemented as an executable program maintained in a tangible, non-transitory memory, such as instruction memory 207 of FIG. 2, that may be executed by one or processors, such as processor 201 of FIG. 2.

In this example, data linkage computing device 102 receives linkage data 380 from a plurality of linkage data servers 110. The linkage data 380 may be obtained in response to linkage data requests 390, for example. The linkage data 380 is received by transceiver 204 via communication port 420, and provided to linkage data partitioning module 412. Linkage data partitioning module 412 is operable to divide the linkage data 380 into various partitions. In some examples, linkage data partitioning module optionally provides the partitioned linkage data to union find module 410, which may execute a Weighted Union Find algorithm, in some examples with Path Compression, to each partition. Union find module 410 may then provide the resulting links in each partition to global shuffle module 404. In some examples, linkage data partitioning module 412 provides the linkage partitioned linkage data to global shuffle module 404.

Global shuffle module 404 may merge the linkage data for a same node into a same partition, and may iteratively execute a Global Shuffle algorithm on the merged linkage data until all connected components are resolved, e.g., where all similar nodes are associated with the same parent ID. Global shuffle module 404 may then provide the resulting links to path compression module 406

Path compression module 406 may execute a Path Compression algorithm on the resulting links to generate path compressed graph data 450. For example, global shuffle module 404 may assign the resulting links to logical partitions, and may iteratively execute the Path Compression algorithm on the resulting links across the logical partitions until all links are path compressed. The results may be stored in database 116.

Figure 6:
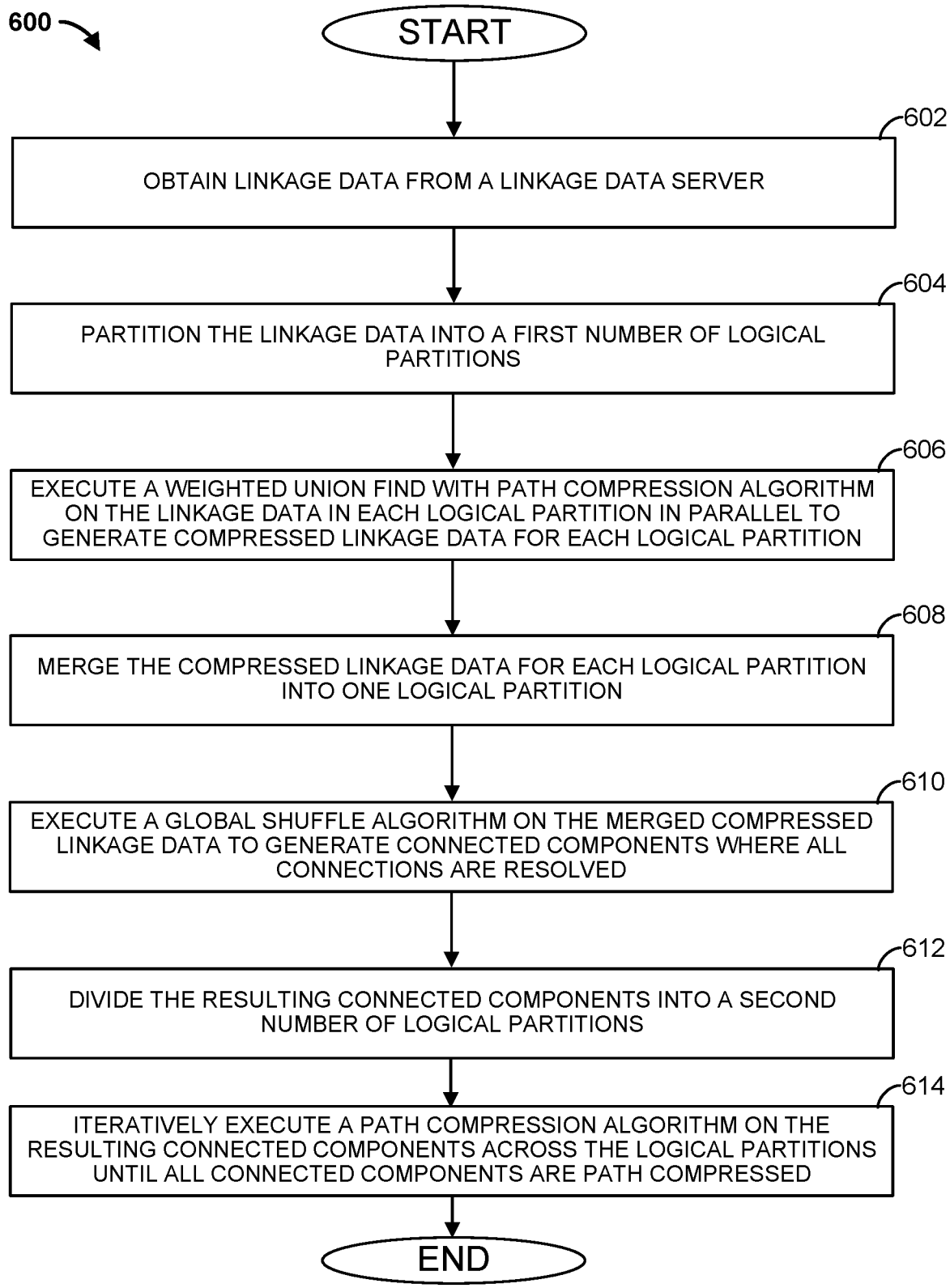
FIG. 6 is a flowchart of an example method that can be carried out by the data linkage computing device of FIG. 1 in accordance with some embodiments.

FIG. 6 is a flowchart of an example method 600 that can be carried out by, for example, the data linkage computing device 102 of FIG. 1. Beginning at step 602, linkage data is obtained from a linkage data server. For example, data linkage computing device 102 may obtain linkage data 380 from linkage data server 110. At step 604, the linkage data is partitioned into a first number of logical partitions. For example, the linkage data may be randomly allocated to a logical partition. Proceeding to step 606, a Weighted Union Find with Path Compression algorithm is executed for linkage data in each logical partition to generate compressed linkage data for each logical partition. The algorithms for each logical partition may be executed in parallel. For example, each partition may be assigned to a VM, where each VM executes the algorithm for its assigned partition.

At step 608, the compressed linkage data for each logical partition is merged into one logical partition to form merged compressed linkage data. Proceeding to step 610, a Global Shuffle algorithm is executed on the merged compressed linkage data to generate connected components that are resolved. For example, all same nodes of the merged compressed linkage data have the same parent ID. Continuing to step 612, the resulting connected components are divided into a second number of logical partitions. The second number of logical partitions may be the same as, or different from, the first number of logical partitions. In some examples, the method may proceed from step 610 directly to step 614, bypassing step 612. For example, step 612 may be optional. At step 614, a Path Compression algorithm is iteratively executed on the resulting connected components across the logical partitions. The Path Compression algorithm is iteratively executed until all connected components are path compressed. The method then ends.

Figure 7:
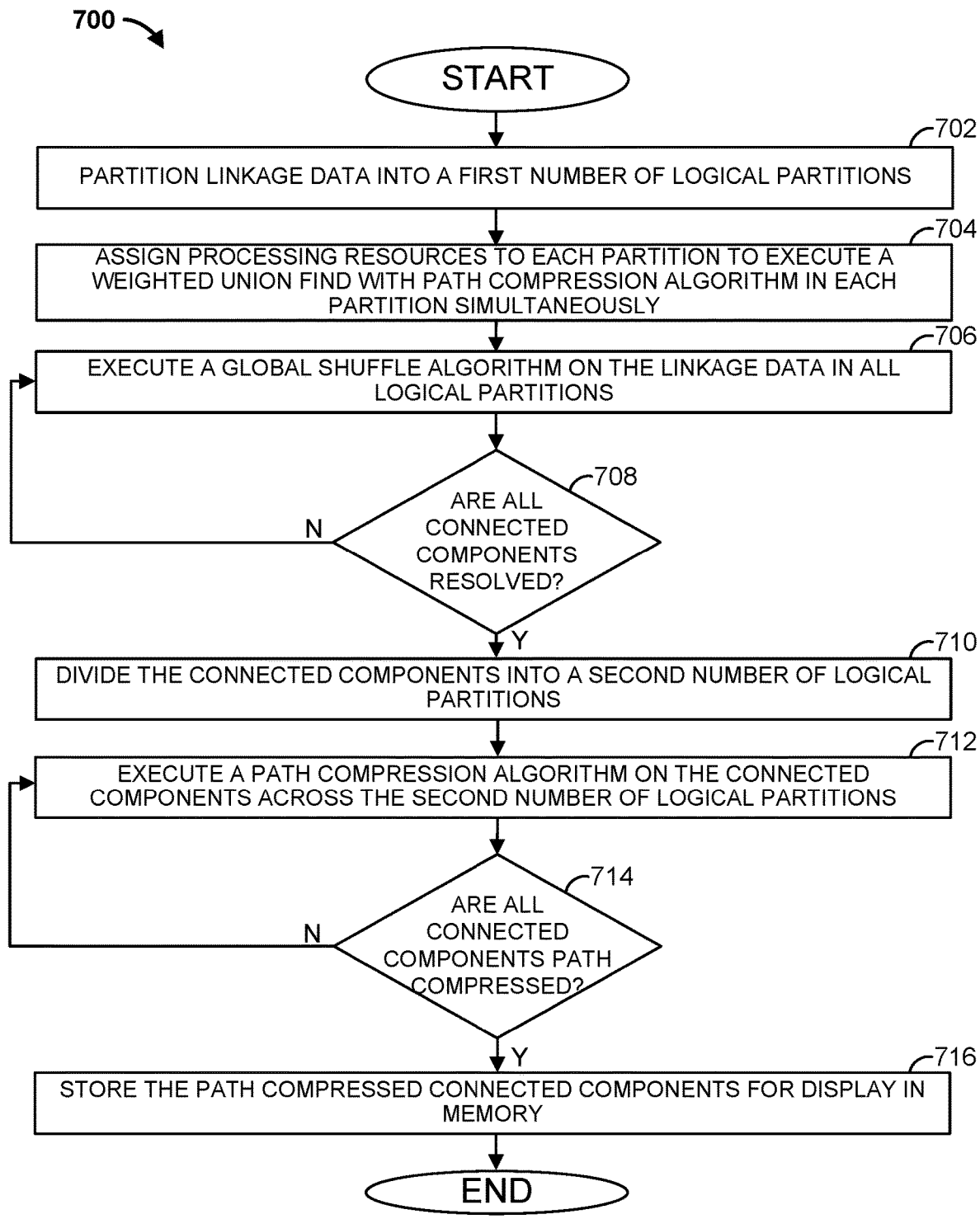
FIG. 7 is a flowchart of another example method that can be carried out by the data linkage computing device of FIG. 1 in accordance with some embodiments.

FIG. 7 is a flowchart of another example method 700 that can be carried out by, for example, the data linkage computing device 102 of FIG. 1. At step 702, linkage data, such as linkage data 380, is partitioned into a first number of logical partitions. At step 704, processing resources are assigned to each partition to execute a Weighted Union Find with Path Compression algorithm based on the linkage data in each partition. The processing resources execute the respective algorithms simultaneously. The assigned processing resources may be, for example, VMs, processors, processing cores, or any other suitable processing resources that may carry out the algorithms.

Proceeding to step 706, after the Weighted Union Find with Path Compression algorithms have been executed, a Global Shuffle algorithm is executed on the linkage data in all logical partitions. For example, the Global Shuffle algorithm operates on all of the linkage data in all of the logical partitions. At step 708, a determination is made as to whether all connected components are resolved. If all connected components are not resolved, the method proceeds back to step 706 to execute another iteration of the Global Shuffle algorithm. Otherwise, if all connected components are resolved, the method proceeds to step 710.

At step 710, the connected components are divided into a second number of logical partitions. The second number of logical partitions may be the same as or different from the first number of logical partitions. In some examples, the method may proceed from step 708 directly to step 712, bypassing step 710. For example, step 710 may be optional. Proceeding to step 712, a Path Compression algorithm is executed on the connected components across the second number of logical partitions.

At step 714, a determination is made as to whether all connected components, across all of the second number of logical partitions, are path compressed. If any connected components are not path compressed, the method proceeds back to step 712, where another iteration of the Path Compression algorithm is executed. Otherwise, if all connected components are path compressed, the method proceeds to step 716. At step 716, the path compressed connected components are stored in memory for display. For example, data linkage computing device 102 may store the path compressed connected components in database 116, and may display them via display 206.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising: a computing device comprising at least one processor and configured to:
   obtain linkage data identifying a plurality of links for a plurality of nodes, wherein each link directly associates at least two of the plurality of nodes: a child node and a parent node having a hierarchy immediately above a hierarchy of the child node;
   partition the linkage data into a first number of logical partitions;
   execute, for each of the first number of logical partitions, a union find algorithm wherein the execution of each union find algorithm assigns an identifier to each node of each link based on the linkage data of each respective logical partition;
execute a global shuffle algorithm that reassigns at least one node,
wherein each of the at least one node has multiple node copies that were linked to different parent nodes respectively in multiple different logical partitions after executing the union find algorithm and before executing the global shuffle algorithm,
wherein each of the at least one node is reassigned based on:
reassigning the multiple node copies from the multiple different logical partitions to a same logical partition of the multiple different logical partitions,
re-linking the multiple node copies, which were linked to different parent nodes in the multiple different logical partitions before executing the global shuffle algorithm, to a same parent node in the same logical partition by executing the global shuffle algorithm; and
execute a path compression algorithm that compresses at least one multiple-hop link, each of which associates multiple nodes in different hierarchies respectively with multiple hops, wherein each of the at least one multiple-hop link is compressed based on:
identifying a final parent node in a highest hierarchy among the multiple nodes,
re-linking the remaining nodes other than the final parent node in the multiple-hop link to the final parent node directly to form multiple single-hop links.

2. The system of claim 1, wherein:
each node in the plurality of links represents a feature of a customer or transaction; and
the computing device is configured to execute the union find algorithms in each logical partition in parallel.

3. The system of claim 1, wherein the computing device is configured to partition the linkage data into the first number of logical partitions based on processing resources available to execute the union find algorithm in each logical partition.

4. The system of claim 3, wherein the processing resources available to execute the union find algorithm in each logical partition is a plurality of Virtual Machines (VMs).

5. The system of claim 1, wherein the computing device is configured to:
iteratively execute the global shuffle algorithm; and
for each iteration, assign a same parent identifier to the multiple node copies that have been reassigned to the same logical partition, wherein the parent identifier identifies the same parent node re-linked to the multiple node copies.

6. The system of claim 5, wherein the computing device is configured to execute the union find algorithm in each logical partition for each iteration of the execution of the global shuffle algorithm.

7. The system of claim 1, wherein the computing device is further configured to:
partition the linkage data into a second number of logical partitions; and
iteratively execute the path compression algorithm across the second number of logical partitions.

8. The system of claim 1, wherein the computing device is configured to:
obtain transaction data; and
generate at least a portion of the linking data based on the transaction data.

9. A method comprising:
obtaining linkage data identifying a plurality of links for a plurality of nodes, wherein each link associates at least two of the plurality of nodes: a child node and a parent node having a hierarchy immediately above a hierarchy of the child node;
partitioning the linkage data into a first number of logical partitions;
executing, for each of the first number of logical partitions, a union find algorithm wherein each union find algorithm assigns an identifier to each node of each link based on the linkage data of each respective logical partition;
executing a global shuffle algorithm that reassigns at least one node,
wherein each of the at least one node has multiple node copies that were linked to different parent nodes respectively in multiple different logical partitions after executing the union find algorithm and before executing the global shuffle algorithm,
wherein each of the at least one node is reassigned based on:
reassigning the multiple node copies from the multiple different logical partitions to a same logical partition of the multiple different logical partitions,
re-linking the multiple node copies, which were linked to different parent nodes in the multiple different logical partitions before executing the global shuffle algorithm, to a same parent node in the same logical partition by executing the global shuffle algorithm; and
executing a path compression algorithm that compresses at least one multiple-hop link, each of which associates multiple nodes in different hierarchies respectively with multiple hops, wherein each of the at least one multiple-hop link is compressed based on:
identifying a final parent node in a highest hierarchy among the multiple nodes,
re-linking the remaining nodes other than the final parent node in the multiple-hop link to the final parent node directly to form multiple single-hop links.

10. The method of claim 9, further comprising executing the union find algorithms in each logical partition in parallel.

11. The method of claim 9, further comprising partitioning the linkage data into the first number of logical partitions based on processing resources available to execute the union find algorithm in each logical partition.

12. The method of claim 9, further comprising:
iteratively executing the global shuffle algorithm; and
for each iteration, assigning a same parent identifier to the multiple node copies that have been reassigned to the same logical partition, wherein the parent identifier identifies the same parent node re-linked to the multiple node copies.

13. The method of claim 12, further comprising executing the union find algorithm in each logical partition for each iteration of the execution of the global shuffle algorithm.

14. The method of claim 9, further comprising:
partitioning the linkage data into a second number of logical partitions; and
iteratively executing the path compression algorithm across the second number of logical partitions.

15. The method of claim 9, further comprising:
obtaining transaction data; and generating at least a portion of the linking data based on the obtained transaction data.

16. A non-transitory computer readable medium having instructions stored thereon, wherein the instructions, when executed by at least one processor, cause a device to perform operations comprising:

obtaining linkage data identifying a plurality of links for a plurality of nodes, wherein each link associates at least two of the plurality of nodes: a child node and a parent node having a hierarchy immediately above a hierarchy of the child node;

partitioning the linkage data into a first number of logical partitions;

executing, for each of the first number of logical partitions, a union find algorithm wherein each union find algorithm assigns an identifier to each node of each link based on the linkage data of each respective logical partition;

executing a global shuffle algorithm that reassigns at least one node, wherein each of the at least one node has multiple node copies that were linked to different parent nodes respectively in multiple different logical partitions after executing the union find algorithm and before executing the global shuffle algorithm, wherein each of the at least one node is reassigned based on:

reassigning the multiple node copies from the multiple different logical partitions to a same logical partition of the multiple different logical partitions, re-linking the multiple node copies, which were linked to different parent nodes in the multiple different logical partitions before executing the global shuffle algorithm, to a same parent node in the same logical partition by executing the global shuffle algorithm; and executing a path compression algorithm that compresses at least one multiple-hop link, each of which associates multiple nodes in different hierarchies respectively with multiple hops, wherein each of the at least one multiple-hop link is compressed based on:

identifying a final parent node in a highest hierarchy among the multiple nodes, re-linking the remaining nodes other than the final parent node in the multiple-hop link to the final parent node directly to form multiple single-hop links.

17. The non-transitory computer readable medium of claim 16, further comprising instructions stored thereon that, when executed by at least one processor, further cause the device to perform operations comprising:

executing the union find algorithms in each logical partition in parallel.

18. The non-transitory computer readable medium of claim 16, further comprising instructions stored thereon that, when executed by at least one processor, further cause the device to perform operations comprising:

partitioning the linkage data into the first number of logical partitions based on processing resources available to execute the union find algorithm in each logical partition.

19. The non-transitory computer readable medium of claim 16, further comprising instructions stored thereon that, when executed by at least one processor, further cause the device to perform operations comprising:

iteratively executing the global shuffle algorithm; and for each iteration, assigning a same parent identifier to the multiple node copies that have been reassigned to the same logical partition, wherein the parent identifier identifies the same parent node re-linked to the multiple node copies.

20. The non-transitory computer readable medium of claim 19, further comprising instructions stored thereon that, when executed by at least one processor, further cause the device to perform operations comprising:

executing the union find algorithm in each logical partition for each iteration of the execution of the global shuffle algorithm.

* * * * *